United States Patent [19]
Bilek

[11] 4,069,508
[45] Jan. 17, 1978

[54] FLEXIBLE MAGNETIC DISC RECORDING SYSTEM

[75] Inventor: Frank Thomas Bilek, Plano, Tex.

[73] Assignee: Texas Instruments Incorporated, Dallas, Tex.

[21] Appl. No.: 661,228

[22] Filed: Feb. 25, 1976

[51] Int. Cl.² .......................... G11B 5/016; G11B 5/76
[52] U.S. Cl. ......................................... 360/99; 360/135
[58] Field of Search ........................ 360/86, 97, 98, 99, 360/133, 135

[56] References Cited

U.S. PATENT DOCUMENTS

| 3,603,742 | 9/1971 | Schuller | 360/99 |
| 3,729,720 | 4/1973 | Darling | 360/135 |
| 3,797,035 | 3/1974 | Hunt | 360/135 |
| 3,830,506 | 8/1974 | Ewert | 360/99 |

Primary Examiner—Robert M. Kilgore
Attorney, Agent, or Firm—Harold Levine; Rene' E. Grossman; Stephen S. Sadacca

[57] ABSTRACT

A system is provided for recording and/or reading information on the upper major surface of a flexible information storage disc. The system is comprised of a stationary surface or smoothing plane and a rotational drive member wherein the flexible disc is rotated over the stationary surface with the lower major surface of such disc facing the stationary surface. At least one opening is provided in the disc for receiving the rotational drive member and engaging therewith to provide the requisite rotation to the disc. The rotational drive member is essentially perpendicular to the stationary surface with the disc being free to move laterally along the drive member. Rotation of the disc causes the disc to rise above the surface, creating an air cushion between the flexible disc and surface. A recording and/or playback head is selectively passed over the upper major surface of the flexible disc for reading and/or writing information on the disc as it rotates.

8 Claims, 14 Drawing Figures

FLEXIBLE MAGNETIC DISC RECORDING SYSTEM

This invention relates to a system for recording and/or reading information from an information storage media and, in particular, to such system in which the information storage media comprises a self leveling, flexible, rotatable member.

BACKGROUND OF THE INVENTION

In recording or reading information on a moving information storage media, such as magnetic recording, relative motion between the record/read head and the storage or recording media is required. The relative velocity between the head and media interface may be, for example, 550 IPS for video and high density digital applications. To achieve maximum performance, there must be an interface of intimate contact between the record/read head and the media surface without destruction or excessive wear of the magnetic field responsive coating on the recording media.

As contact pressure between the head and media is increased to improve performance, both media and head wear are increased. The problem is particularly severe in video applications and compounded where the media is utilized for storing single video frames on separate tracks of a magnetic disc wherein the single tracks are continuously in contact with the head to provide continuous stationary displays of the single frames. In only five minutes of play time revolving at 3600 RPM, for example, a track on the disc is scraped about 18,000 times by the head. The wear products are so hard and abrasive that they are commonly used as lapping compounds. Thus, intimate contact very rapidly abrades the track and the magnetically stored information is destroyed.

To prevent failure caused by contact between the head and disc, lubricated surfaces and/or air film separations have been used. However, any separation between the head and disc caused by such lubricating fluid or air film imposes a loss of signal and hence performance. This spacing loss is equal to about 54.6 $d/\mu$ dB where $d$ is the head/disc separation in inches and $\mu$ is the recorded wavelength in inches. Thus, a head/disc separation equal to the wavelength would cause about a 54.6 dB loss in the output of the replay head. Since it is desired to record wavelengths that approach 70 $\mu$ -in., the playback head voltage is reduced by 50% by only 7.7 $\mu$ -in., of separation. On the other hand, as discussed above, reduction of separation to meet desired performance would cause the interface to be destroyed within a few seconds.

Prior art solutions to the head to disc interface problem have generally been of two types: flying heads in conjunction with rigid hard-plated discs, and heads having large surface areas buried in soft flexible "floppy" discs. Utilizing the first technique of flying heads on a large plated disc requires a rigid substrate, usually aluminum, covered by a magnetic field responsive material such as nickel cobalt plated to a thickness of about 10 $\mu$ -in. and covered by about 5 $\mu$ -in. of plated rhodium for wear protection. Aside from the fact that these discs are very expensive, in order to prevent excessive wear, the record head is required to fly on a cushion of air when the disc revolves at full speed. The head to disc separation is usually between 35-50 $\mu$ -in. The delicate balance of forces which keep the head flying above the surface utilizing this technique can be disturbed by minute dust particles or fingerprints which may cause the head to catastrophically crash into the disc. Consequently, the disc cannot be handled without gloves, is ordinarily handled in a special clean room environment, and is usually sealed within an evacuated container. By increasing the flying height, head crashes are less prevalent, but separation then prohibits performance except for low frequency digital applications. Thus, as seen from the above description, flying heads on rigid discs is nonsuitable for low cost, high volume consumer applications such as video recordings.

The flexible or so-called "floppy" reduces the handling and cost problems realized in the above rigid disc system. Until now, however, record/read heads for floppy discs were relatively large to provide an interface comprised of the large contoured head buried in the soft flexible media. The large record/read head surface area distributes the force per unit area to reduce media wear and separation loss. As the media is moved past the head, however, air will collect between the head and disc surface to form a film. The thickness of this air film is a function of media tension, head surface radius, viscosity of the air, and disc head relative velocity which may be approximated by the function $h$ (air film thickness) = $0.642R \, [6 \, \mu \, v/T]^{3/2}$ where R is the head profile radius, v is the relative velocity, T is the media tension and $\mu$ is the viscosity of air. Accordingly, most flexible or "floppy" disc applications are limited to slow speed, low bandwidth digital computer applications. The performance penalty realized by the prior art has precluded the use of a flexible or "floppy" disc interface for wide bandwidth or video type applications.

It is therefore an object of the present invention to provide an improved technique for storing information on a flexible storage media.

Another object of the invention is to provide an improved system for magnetically storing information on a flexible magnetic recording disc.

A further object of the invention is to provide a system which permits the continuous long-term reproduction of wide bandwidth signals from a flexible magnetic storage disc without excessive wear to the record surface of the disc or the record head and without sacrificing performance.

Still another object of the invention is to provide a flexible information storage media with tension and stability as well as compliance and resilience.

A still further object of the invention is to provide an apparatus which includes a flexible magnetic storage disc which permits a high performance narrow track video record head to be used in contact with the magnetic disc.

It is another object of the invention to provide an apparatus which permits the recording and reproducing of a wide bandwidth signal such as a video signal utilizing an inexpensive flexible particulate type recording media.

It is another object of the invention to provide an apparatus in which a head-to-disc interface is provided which is capable of recording wavelengths of 1.2 mils to 70 $\mu$ in. without significant separation loss at a low relative velocity of, for example, 150 IPS.

It is another object of the invention to continuously reproduce slow speed recorded signals for a long time at a much higher relative velocity of, for example, 550 IPS without significant head or media wear.

It is still another object of the invention to use the same media and media supporting and stabilization apparatus for both record and replay of flexible discs.

It is another object of the invention to provide an apparatus which permits reproduction of RF frequencies of 450 KHz to 6.5 MHz at 550 IPS on the same track for up to 10 hours without deleterious separation losses.

It is another object of the invention to provide an apparatus which is able to record and replay within 0.1 $\mu$ in. of the outer edge of a flexible disc.

It is still another object of the invention to provide a system in which a flexible disc is rotated as a free form without additional tensioning apparatus or rotating plates for stabilization.

Another object of the invention is to continuously replay a flexible magnetic storage media while maintaining an air-bearing of preselected thickness between the replay head and media regardless of head loading.

A further object of the invention is to provide a compliant, but relisient magnetic recording surface capable of withstanding shock, vibration and head "crashes" without media degradation.

A still further object of the invention is to provide stable record or playback of a flexible storage media while it is in rotation in any plane, including upside down.

These and other objects and advantages are provided in accordance with the present invention in which a system is provided for recording and/or reading information on the upper major surface of a flexible information storage disc. The system is comprised of a stationary surface or smoothing plane and a rotational drive member wherein the flexible disc is rotated over the stationary surface with the lower major surface of such disc facing the stationary surface. At least one opening is provided in the disc for receiving the rotational drive member and engaging therewith to provide the requisite rotation to the disc. The rotational drive member is essentially perpendicular to the stationary surface with the disc being free to move laterally along the drive member. Rotation of the disc causes the disc to rise above the surface, creating an air cushion between the flexible disc and surface. A recording and/or playback head is selectively passed over the upper major surface of the flexible disc for reading and/or writing information on the disc as it rotates. In an embodiment of the invention, the drive member includes a pin of a preselected shape which makes positive engagement with a similarly shaped opening in the disc to correctly position the disc and to prevent angular slippage thereof. In an alternate embodiment, a second opening and second pin are provided for this purpose. In a preferred embodiment of the system of the invention, the media is comprised of a flexible plastic disc having a magnetic flux responsive layer adherently formed on the upper major surface thereof.

BRIEF DESCRIPTION OF THE DRAWINGS

Still further objects, advantages and features of the invention will become apparent from the detailed description and claims when read in conjunction with the accompanying drawings wherein:

DETAILED DESCRIPTION OF THE INVENTION

Various aspects and features set forth in the following detailed description are provided herein for purposes of continuity, clarity and completeness; these features are claimed in copending U.S. Pat. applications Ser. Nos. 647,021; 647,022; 647,023; and 647,024, each filed on Jan. 7, 1976 and assigned to the assignee of the present invention.

Figure 1:
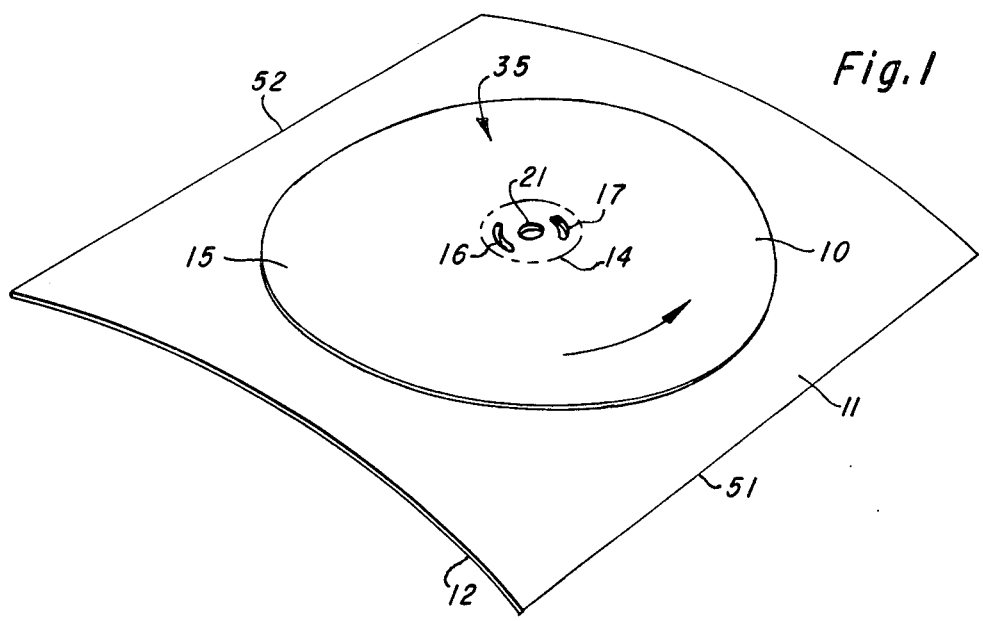
FIG. 1 is a perspective view of an apparatus embodying the present invention.
Figure 2:
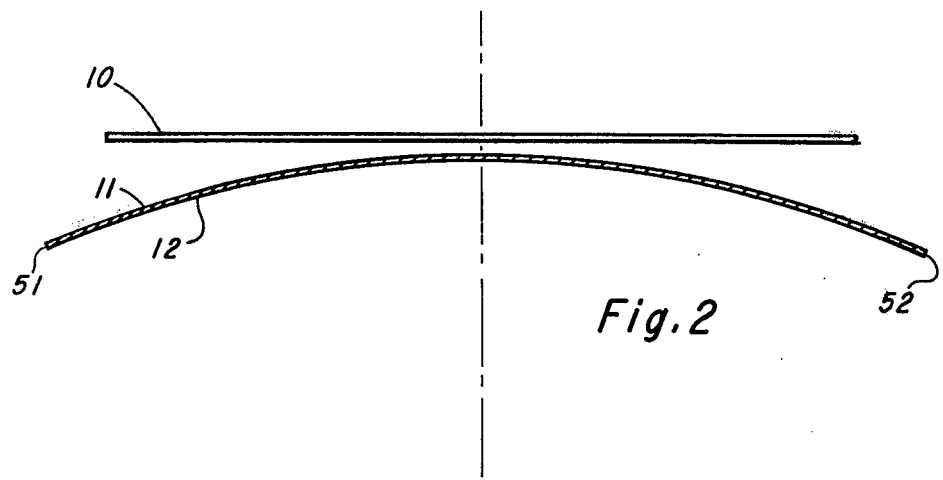
FIG. 2 is a cross-sectional view of the embodiment of FIG. 1.
Figure 3:
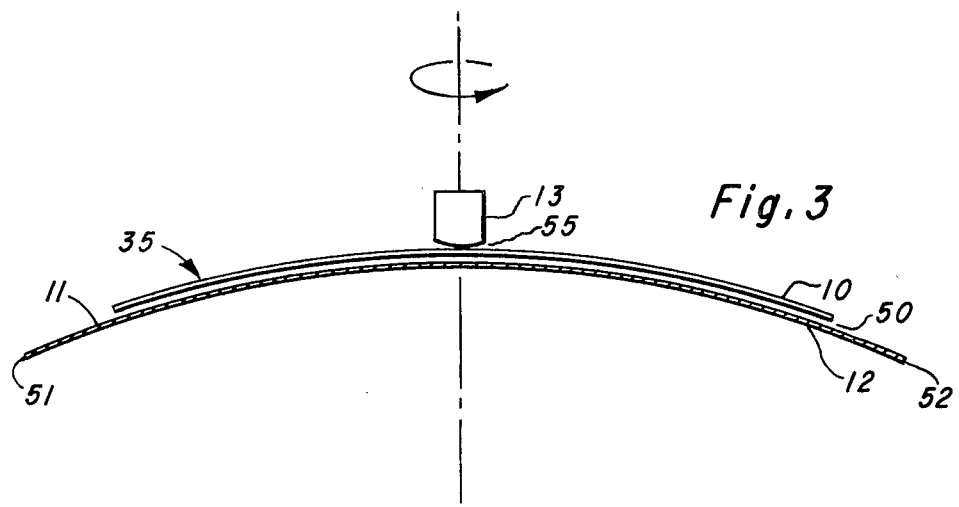
FIG. 3 is a cross-sectional view of the embodiment of FIG. 1 with the disc member in rotation.

Referring then to FIGS. 1-3, an apparatus for recording and/or reading information on the upper major surface 35 of a flexible information storage media 10 such as a flexible magnetic recording disc is shown. The apparatus is comprised of a body such as body 12 having a stationary surface or smoothing plane 11 wherein flexible disc 10 is rotated over stationary surface 11 with the lower major surface of such disc (opposite surface 35) facing stationary surface 11; rotation of disc 10 causes the disc to conform to the curvature of surface 11 of body 12 as shown in FIG. 3.

The information storage media includes a central mounting portion 14 and an outer body portion 15 providing a surface area on which information may be recorded. In the embodiment illustrated in FIG. 1, outer body portion 15 includes a layer of magnetic flux responsive material at surface 35 for magnetically recording the information. Central mounting portion 14 includes a pair of apertures 16 and 17 for coupling disc 10 to a rotational means to provide the rotational velocity to the disc and a third aperture 21 for mounting disc 10 in a housing. The significance of each of these apertures will be discussed in particular detail later in this specification with reference to FIGS. 7-13.

In this particular embodiment, the body 12 is comprised of a flexible spring material such as a conventional polyester mylar material of, for example, 7.5 mils in thickness. The mylar spring may be rigidly attached along the outer edges 51 and 52 while allowing the portion about the vertex at the central generatrix of the curve to be free to move up and down under the pressure of the record/read head with disc 10 in rotation.

Recording and/or playback is accomplished by positioning a record/read head 13 in contact with surface 35 of information storage disc 10 at selected positions along the vertex by outer body portion 15 of disc 10 as disc 10 conforms to the curvature of surface 11. The springiness of the mylar comprising body 12 combined with the air flow 50 provided according to the present invention between the disc and the surface 11 allows for a considerable latitude in vertical head positioning and head pressure. As head pressure is increased, head 13 pushes on disc 10 which deflects flexible body 12 by coupling through air layer 50 which now forms between disc 10 and surface 11 while disc 10 is in rotation. Thus, it is apparent that almost identical head/media coupling is obtainable over a relatively wide range of head pressures and head heights.

The stationary surface 11 is preferably cylindrical having a parabolic or circular directrix, for example, with, for example, at 6 inch radius; although it is contemplated that surfaces of other contours and of any desired size may be substituted therefor.

The surface of record/read head 13 which contacts surface 35 of disc 10 is curved to provide an air film or bearing 55 between head 13 and recording surface 35. For example, for a surface with a 6 inch radius the head may be contoured with a 4.0 inch radius.

Figure 4:
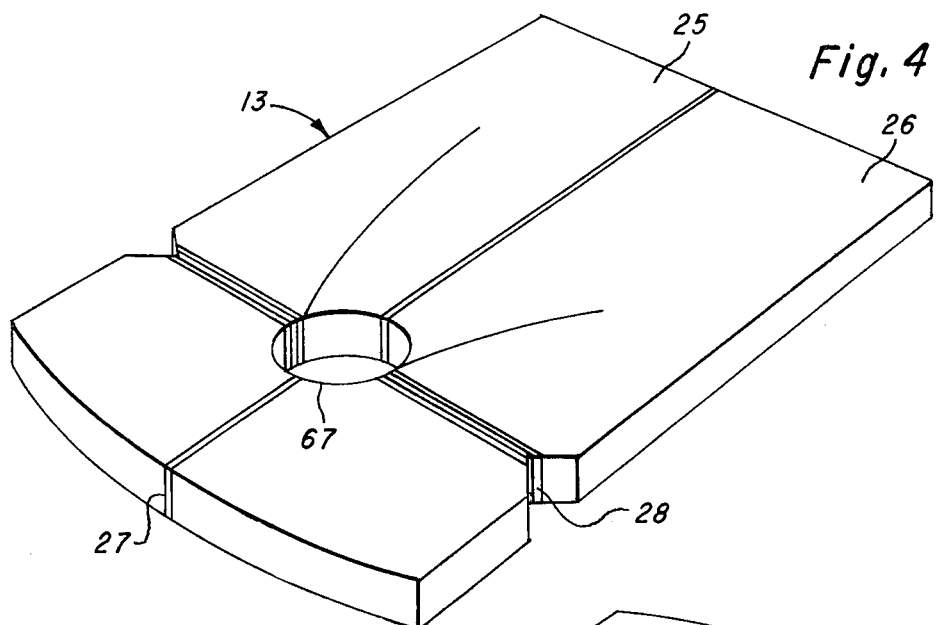
FIG. 4 is a perspective view of a magnetic recording and/or playback head utilized in conjunction with various embodiments of the present invention.

For magnetic recording, a magnetic record/replay head such as that shown in detail in FIG. 4 is utilized. The head is comprised of two or ferrite sections 25 and 26 separated by a 30-70 microinch gap 27. The sections 25 and 26 together provide a magnetic recording head 160-180 mils in width, for example, and about 5-6 mils in thickness. A coil 28 wrapped around the head through opening 67 selectively changes electrical energy to magnetic energy and/or magnetic energy to electrical energy for writing and/or reading information on a layer of magnetic flux responsive material formed on surface 35 of disc 10. The head may be comprised, for example, of Alfesil recording head material. The flux responsive material utilized for the magnetic type disc is, for example, comprised of a coating of magnetic particles such as that utilized on conventional recording tape formed on a polyester base material. The coated material which is commercially available in sheet form is cut into 2-5 inch diameter circles. A typical embodiment is cut, for example, to 3 ½ inches in diameter from standard 6 inch web material of the type used in video tape recording or high density digital tape recording. The material is, for example, co-doped Y-$Fe_2O_3$ media having a coercivity of 500 OER. The overall media thickness is, for example, 1-3 mils and the thickness of the magnetic coating is preferably 50 microinches or more for the recording of long wavelengths in video applications. No special surface finish is required.

Figure 5:
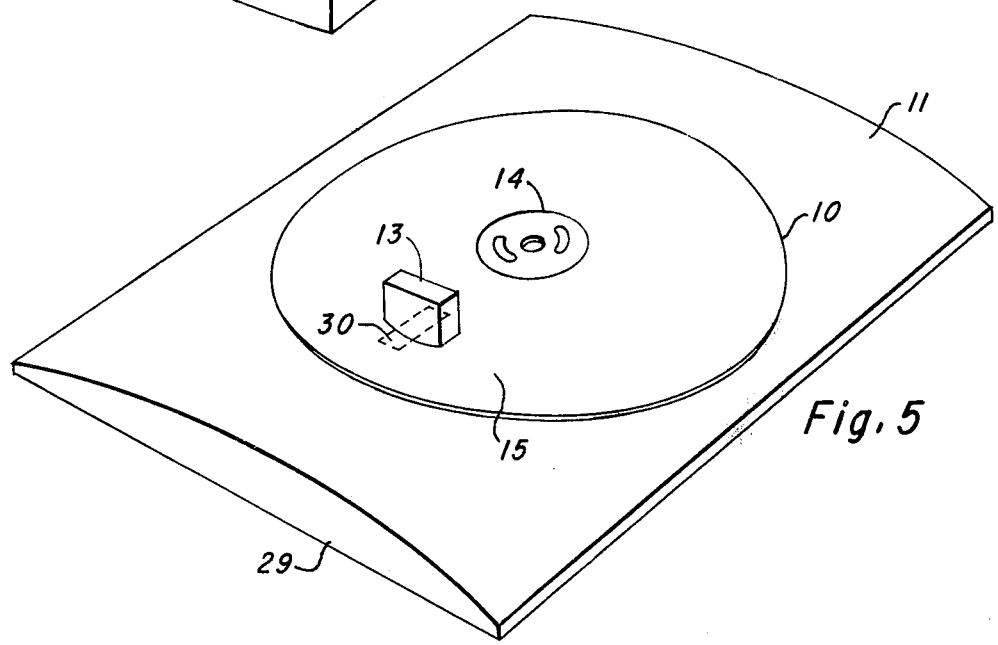
FIG. 5 is a perspective view of another embodiment of the invention.
Figure 6:
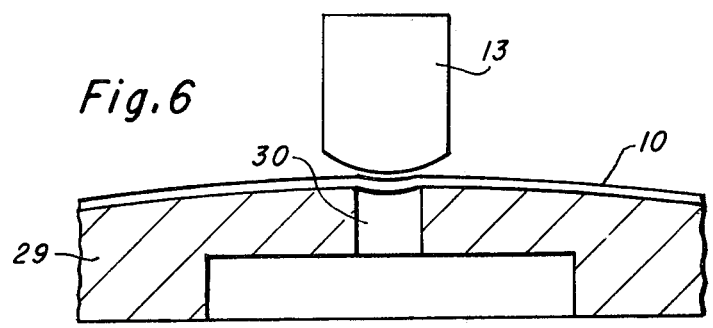
FIG. 6 is a partial cross-sectional view of the embodiment of FIG. 5.
Figure 7:
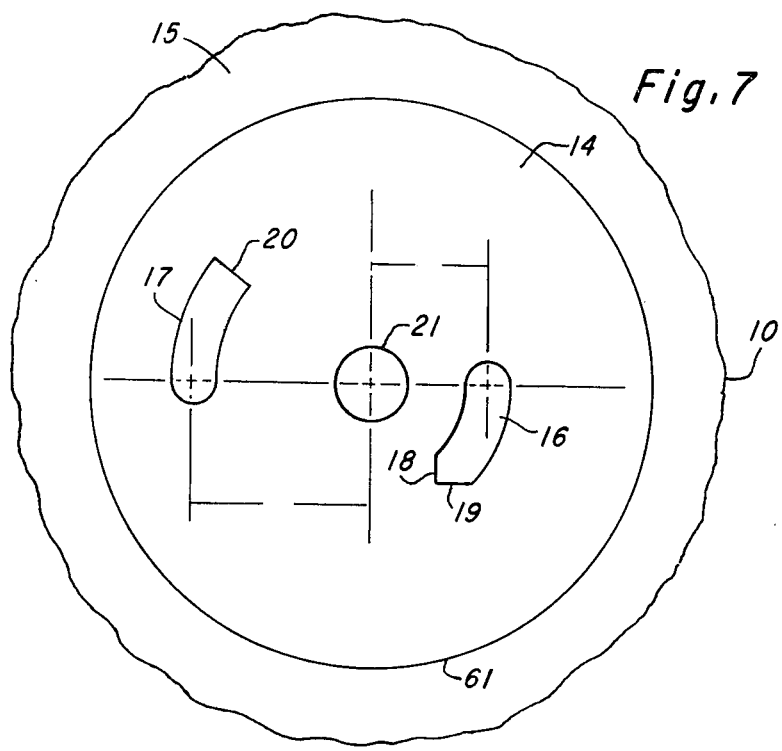
FIG. 7 is a partial top view of the central mounting portion of a flexible information storage disc utilized in accordance with various embodiments of the invention.

Referring to FIGS. 5 and 6, an embodiment is shown which is comprised of a rigid (rather than a flexible) body 29 having an opening or window 30 formed in the cylindrical surface 11 thereof. The body is comprised, for example, of a rigid plastic material or a metal material such as aluminum having a smooth or polished cylindrical surface 11. The information storage media, such as flexible disc 10, is rotated over cylindrical surface 11 with the lower major surface of disc 10 facing surface 11 so that rotation of disc 10 causes the disc to conform to the curvature of body 29. A recording and/or playback head 13 located over opening 30 is selectively positioned or indexed over the upper major surface of disc 10 for reading and/or writing information on disc 10 as it rotates. For the 160-180 mil wide recording head, such as that illustrated and described with respect to FIG. 4, the opening 30 is, for example, about 165-185 mils in width, respectively. The length of opening 30 is governed by the number of tracks or index positions which are provided with respect to the disc, each track or index position requiring at least one head thickness (i.e., greater than 5 mils). For example, 3 ½ inch diameter disc may contain 20-40 tracks of recorded video information, each track representing a single frame still picture. The opening 30 compensates for variance in head pressures and head heights to provide a more uniform head/media coupling similar to that obtained with the spring flexible material of the embodiment of FIG. 2.

As previously mentioned with respect to FIG. 2, the flexible information storage disc 10 embodied in the present invention includes a central mounting portion 14 and an outer body portion 15 providing a surface area on which information may be recorded. In one embodiment illustrated in detail in FIG. 7, central mounting portion 14 is provided with at least first and second apertures 16 and 17 disposed radially outwardly with respect to the geometric center of the disc. Apertures 16 and 17 are respectively arcuately elongated in directions conforming to rotation of the disc about its geometric center. The leading end of aperture 16 is defined by a pair of straight edges 18 and 19 angularly intersecting at an apex and the leading end of aperture 17 is defined by a single straight edge 20. The pair of intersecting straight edges 18 and 19 bounding the leading end of aperture 16 and the single straight edge 20 bounding the leading end of aperture 17 cooperate to provide three abutment edges arranged in respectively different planes normal to disc 10 for precisely locating disc 10 both radially and angularly. The single straight edge 20 of aperture 17 is preferably inclined along a radius extending from the geometric center of disc 10. One of the apertures 16 or 17 may be closer to the geometric center and respectively shorter in length than the other aperture in order to prevent the disc from being mounted 180° out of phase. The central mounting portion 14 may include one or more layers of reinforcing material 61 to prevent excessive wear of edges 18, 19, and 20. As will be discussed later, with respect to FIGS. 9-13, a housing may be provided containing disc 10. In such embodiment, disc 10 includes a third aperture 21 located in the approximate geometric center of the disc and the housing includes a retaining member extending through such third aperture for rotatably retaining the disc within the housing; the disc being free to rotate on such retaining member about its geometric center and also being free to move laterally up and down on the retaining member in order to be self-leveling according to the principles of the present invention.

Figure 8:
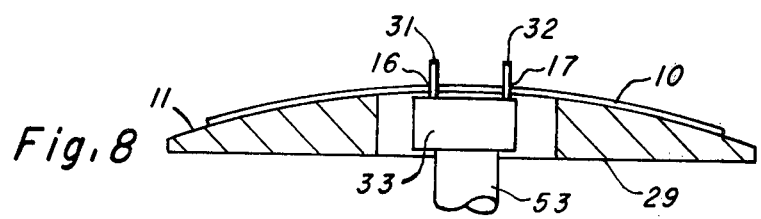
FIG. 8 is a cross-sectional view of the embodiment of FIG. 5 showing a rotational means coupled to the central mounting portion of the information storage disc shown in FIG. 7 with the disc in rotation.
Figure 9:
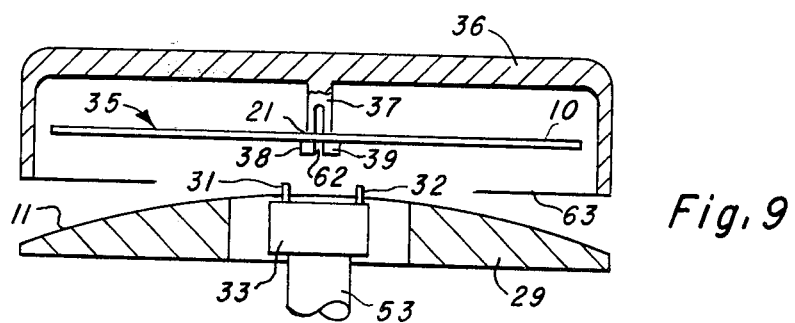
FIG. 9 is a cross-sectional view of the information storage disc of FIG. 8 contained within a housing to provide a cartridge which is mountable on the cylindrical surface of the embodiments shown in FIGS. 1 and 5.

As illustrated in FIG. 8, a corresponding rotational means 33 includes a pair of pin members 31 and 32 which are couplable to central mounting portion 14 of disc 10 by insertion into openings 16 and 17. Rotational drive is provided to rotational means 33 by shaft 53. The embodiment illustrated in FIG. 8 is similar to the embodiment of FIG. 5. The disc 10 is mounted on the cylindrical surface 11 of body 29 by placing the openings 16 and 17 over pins 31 and 32, respectively. As soon as rotational means 33 begins to rotate, pin 31 contacts leading edges 18 and 19 and pin 32 contacts leading edge 20 to precisely locate the disc both radially and angularly. As the rotating disc 10 picks up speed, the disc conforms to the curvature of the cylindrical surface 11 of body 29 and disc 10 seeks its own level as an air cushion forms between surface 11 and disc 10.

Referring now to FIGS. 9-13, as previously mentioned, disc 10 may be mounted within a housing such as plastic upper housing member 36. The member 36 which may contain a 3 ½ inch diameter disc may have a 3.75-4 inch square opening in the bottom thereof, for example, which fits over a 3.75-4 inch body 29 (or body 12 of FIG. 1). A retaining member 37 affixed to housing 36 extends through the centrally located opening 21 of disc 10 for retaining disc 10 in housing 36 with disc 10 being free to rotate on as well as move laterally along retaining member 37. Opening 21 is sufficiently large to permit some sideward movement of disc 10 on retaining member 37 so that only edges 18, 19 and 20 are critical to the precise alignment of disc 10. Retention member 37 is comprised, for example, of a cylindrical shaft which is smaller than cenrally located opening 21 having an expanded portion, comprised of members 38 and 39, for example, which is larger than cenrally located opening 21 for retaining disc 10 on shaft 37. Where the housing 36 is comprised of plastic, for example, shaft member 37 may be comprised of spring flexible plastic material and include a slot shaped opening 62 extending through the shaft wherein the expanded portion comprised of members 38 and 39 is compressible to the smaller size of the centrally located opening 21 for initially receiving disc 10. Members 38 and 39 then spring back to their original positions to retain the disc.

A thin flexible membrane 63 may be provided covering the large bottom opening which accepts the body 29 in order to further protect the disc 10 from contamination. Membrane 63 includes an aperture for receiving rotational means 33 with membrane 63 being conformable to the contour of cylindrical surface 11 when the body 29 is in place. Disc 10 would then rotate with its bottom major surface facing membrane 63; an air layer would then be formed between membrane 63 and disc 10 with the disc in rotation to provide the desired self-leveling effect.

Figure 10:
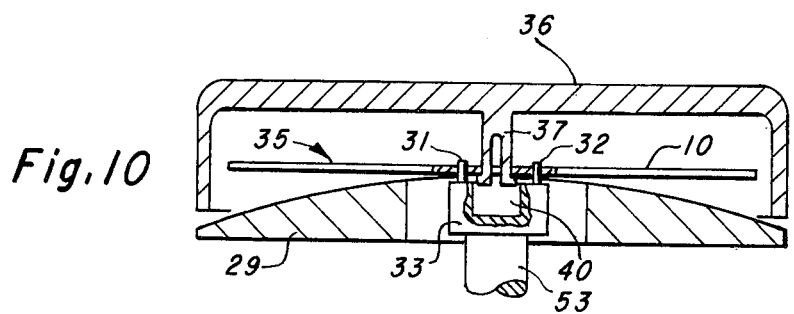
FIG. 10 is a cross-sectional view of the embodiment of FIG. 9 with the cartridge positioned over the body having the cylindrical surface and the rotational means mechanically coupled to the central mounting portion of the information storage disc.

FIG. 10 shows housing 36 being placed over body 29 with disc 10 being engaged by pins 31 and 32 of rotational means 33. An aperture 40 is provided in rotational means 33 for receiving shaft 37 as shown.

Figure 11:
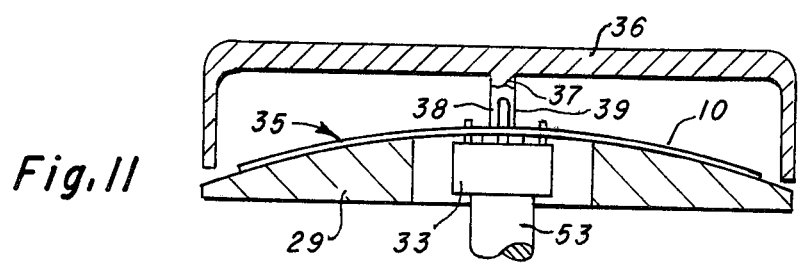
FIG. 11 is a cross-sectional view of the cartridge embodiments of FIGS. 9 and 10 with the rotational means coupled to the flexible disc, in rotation.

FIG. 11 shows housing 36 in place with rotational means 33 in rotation causing disc 10 to conform to the curvature of the cylindrical surface of body 29.

Figure 12:
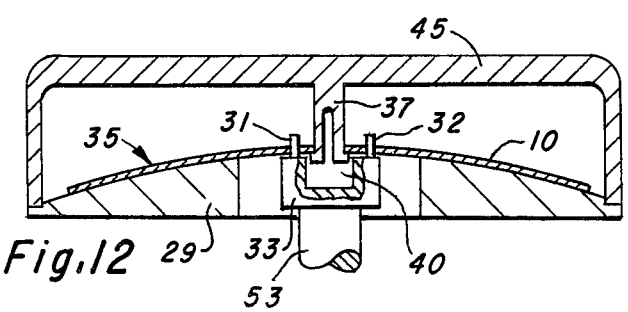
FIG. 12 is a cross-sectional view of another cartridge embodiment in which the body having the cylindrical surface is permanently affixed to the remainder of the housing to form an integral member of the cartridge.
Figure 13:
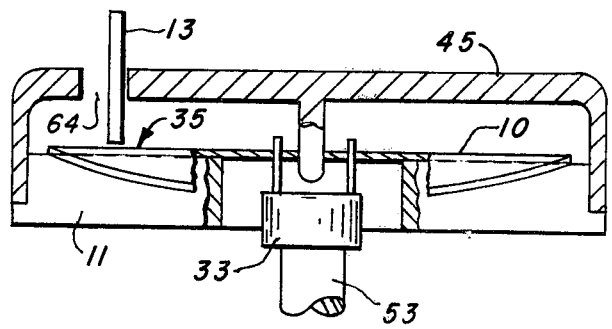
FIG. 13 is a right angled cross-sectional view of the embodiment as illustrated in FIG. 12.

In an alternate embodiment, as shown in FIG. 12, the cartridge may be comprised of a housing 45 which includes as an integral part thereof the smoothing plane provided by body 29 permanently affixed to the upper housing portion with disc 10 sealed within housing 45 between the upper body portion and the smoothing plane body 29. In this embodiment, the cartridge including the body 29 is placed over rotational means 33 for engagement of disc 10 by pins 31 and 32. As shown in FIG. 13, an opening 64 is provided in the upper portion of housing 45 (as well as in housing 36 of FIGS. 9-11) to receive recording/playback head 13 which respectively reads and/or writes information on recording surface 35 of disc 10. The opening 64 is sufficiently wide to permit indexing at various positions to allow recording and/or reading information at various concentric tracks of the disc. Although the coupling between the disc and rotational member in the above embodiments has been described to include a plurality of selectively shaped, non-centrally located openings in the disc and a pair of correspondingly located pin members comprising the rotational member, it is contemplated that other arrangements may be utilized within the scope of the present invention. For example, a single centrally located, rectangular or keyhole shaped opening in the disc may be coupled to a correspondingly shaped pin member comprising the rotational means to provide both rotation drive and alignment to the disc. In still another embodiment, two openings may be provided in the disc, a first centrally located opening and a second non-centrally located opening with the rotational means having two correspondingly located pin members. The two pin members, in combination, locating the disc with respect to the rotational means and the non-centrally located pin member providing the desired rotational drive. In each of the above alternate embodiments, the disc should be free to move laterally along the pin members so that the disc may seek its own level when the disc is rotating on the stationary surface or smoothing plane.

Figure 14:
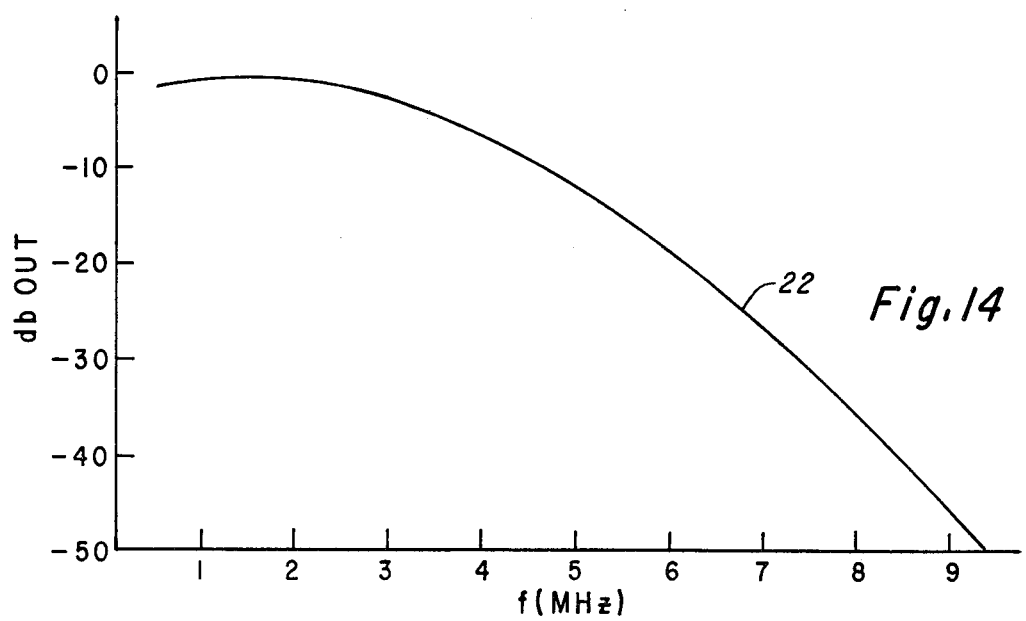
FIG. 14 is a graph showing an exemplary performance curve of Interface Output Voltage versus Frequency as generated by a model embodying the present invention.

FIG. 14 shows a curve 22 of plotted data representing the RF response of the playback interface provided by the above technique. The ordinate is the head/media voltage output expressed in dB. The abscissa is frequency in MHz. The data was taken after about 8 hours of continuous reproduction at 3600 RPM of a single magnetic track recorded at 3.1 inches diamter of a 3.5 inch diameter disc (584 IPS relative head/disc velocity). The conventional reproduction head had a gap length of 67 microinches. By comparison, the RF response provided in accordance with such examplary embodiments of the present invention favorably compares with the performance of relatively expensive and complex quadrature and helical scan interfaces used in video tape recording equipment. In such video tape recording equipment, the video tape is stretched across elaborate scanner apparatus and is continuously replenished by tape movement.

Various embodiments of the invention have now been described in detail. It is anticipated that various modifications may be made to the described embodiments such as utilizing different materials of construction, or changing the shape or size of various elements thereof. Although the preferred embodiment of the invention utilizes magnetic recording techniques, other information storage techniques such as optical, electrical, or other recording and playback techniques may advantageously be provided on a flexible media in acccordance with the present invention.

Since it is obvious that many additional changes and modifications can be made in the above-described details without departing from the nature and spirit of the invention, it is understood that the invention is not to be limited to said details except as set forth in the appended claims.

What is claimed is:

1. A system for recording and/or reading information on a major surface of a sheet of flexible information storage media having upper and lower opposite major surfaces and at least one opening therethrough comprising:
   a. a body having a stationary smoothing plane surface;
   b. rotational means having an upper major surface located substantially in or below said smoothing plane surface for rotating said information storage media over said stationary surface with the lower major surface of said information storage media facing said stationary surface and the upper major surface of said rotational means, said rotational means having at least one pin member which mates with said at least one opening for coupling said information storage media to said rotational means, said at least one opening having a larger perimeter than said at least one pin member to the extent that said information storage media is freely laterally movable along said pin member wherein a fluid cushion of optimum thickness is substantially evenly formed between said stationary surface and the lower major surface of said storage media when said information storage media is in rotation over said stationary surface, and also forms, to at least said predetermined thickness, a fluid layer between the upper major surface of said rotational means and the lower major surface of said storage media, said fluid being drawn through said at least one opening to form said cushion and said information storage media being self-positioning along said pin member; and
   c. a recording and/or reading head mounted in a predetermined position with respect to the stationary surface of said body for recording and/or reading said information on said information storage media when said media is in rotation.

2. The system according to claim 1 wherein said information storage media are disc-shaped members having a magnetic flux responsive coating formed on the respective upper major surfaces thereof.

3. The system according to claim 1 wherein said at least one opening and said pin member are of a predetermined noncircular shape, said information storage media being nonangularly movable with respect to said rotational means when mounted on said rotational means.

4. The system according to claim 1 wherein at least a second opening is provided in said information storage media for positioning said information storage media with respect to a second pin member on said rotational means, at least one of said first and second openings and respective pin member being noncentrally located and said information storage media being laterally movable along said second pin member.

5. A system for recording and/or reading information on a recording surface of flexible information storage media, said media including a sheet of flexible material having upper and lower major surfaces, a central mounting portion extending radially outwardly from the approximate geometric center of said sheet and an outer body portion integral with the center mounting portion and concentric therewith, the outer body portion of one of the major surfaces of said flexible material providing said recording surface on which information may be recorded, said central mounting portion being provided with at least one aperture extending from said upper major surface to said lower major surface, said system comprising:
   a. a body having a stationary smoothing plane surface and an opening extending to said stationary surface;
   b. rotational means having an upper major surface opening with said upper major surface located substantially in or below said smoothing plane surface for rotating said sheet of flexible material over said stationary surface with the lower major surface of said flexible material facing said stationary surface, said rotational means having at least one pin member which mates with said at least one aperture for coupling said information storage media to said rotational means, said at least one opening having a large perimeter than the perimeter of the said at least one pin member to the extent that said information storage media is freely laterally movable along said pin member wherein a fluid cushion of predetermined optimum thickness is substantially evenly formed between said stationary surface and the lower major surface of said storage media when said information storage media is in rotation over said stationary surface, and also forms, to at least said predetermined thickness, a fluid layer between the upper major surface of said rotational means and the lower major surface of said storage media, said fluid being drawn through said at least one opening to form said cushion and said information storage media being self-positioning along said pin member with respect to said rotational means; and
   c. a recording and/or reading head mounted in a predetermined position with respect to the stationary surface of said body for recording and/or reading information on the outer body portion of the recording surface of said sheet of flexible material when said sheet of flexible material is in rotation over said surface.

6. The system according to claim 5 wherein said sheet of flexible material is disc-shaped members having a magnetic flux responsive coating formed on the respective outer body portions of the upper major surfaces thereof.

7. The system according to claim 5 wherein said at least one aperture and said pin member are of a predetermined noncircular shape, said information storage media being nonangularly movable with respect to said rotational means when mounted on said rotational means.

8. The system according to claim 5, wherein at least a second aperture is provided in the central mounting portion of said sheet of flexible material for positioning said sheet with respect to a second pin member on said rotational means, at least one of said first and second openings and respective pin member being disposed radially outwardly with respect to the approximate geometric center of said sheet and said information storage media being laterally movable along said second pin member.

* * * * *